United States Patent [19]

Willis

[11] Patent Number: 5,598,041
[45] Date of Patent: Jan. 28, 1997

[54] EFFICIENT FAULT TOLERANT SWITCHING CIRCUIT FOR REDUNDANT D. C. POWER SUPPLIES

[75] Inventor: Scott C. Willis, Manassas, Va.

[73] Assignee: Lockheed Martin Corporation, Bethesda, Md.

[21] Appl. No.: 559,584

[22] Filed: Nov. 16, 1995

[51] Int. Cl.⁶ .................................................. H02J 1/04
[52] U.S. Cl. .............................. 307/43; 307/64; 307/48; 307/66; 307/69; 307/70; 307/80; 307/85; 307/86; 307/51
[58] Field of Search ................................. 307/64, 43, 48, 307/66, 69, 70, 80, 85, 86, 51

[56] References Cited

U.S. PATENT DOCUMENTS 4,651,020  3/1987  Kenny et al. .
4,788,450  11/1988  Wagner .................................. 307/64
4,812,672  3/1989  Cowan et al. .
5,070,253  12/1991  Wagner .................................. 307/75
5,315,533  5/1994  Stich et al. .
5,315,549  5/1994  Scherpenberg .

Primary Examiner—William M. Shoop, Jr.
Assistant Examiner—Kimberly R. Lockett
Attorney, Agent, or Firm—Lane, Aitken & McCann

[57] ABSTRACT

Two power sources are connected to a load by a pair of MOSFET control switches, each connected respectively in series between one of the sources and the load, with their integral diodes forwardly biased between the power source and load. An isolating MOSFET switch is connected in series between the pair of MOSFET control switches and the load with its integral diode back biased between the power sources and the load. Two control lines control the on-off state of all three MOSFET switches so that the isolating MOSFET switch is on when either control switch is on and is off when both control switches are off.

9 Claims, 1 Drawing Sheet

5,598,041

EFFICIENT FAULT TOLERANT SWITCHING CIRCUIT FOR REDUNDANT D. C. POWER SUPPLIES

BACKGROUND OF THE INVENTION

1. Field of the Invention

This invention relates to an improved switching circuit for redundant, d.c. power supplies, and, more particularly, to a circuit for efficiently coupling and for dynamically decoupling the power sources to a load.

2. Description of the Prior Art

Uninterruptible power supplies commonly have two, redundant, d.c. power sources connected by relays or solid state switches to a single load. If one of the power supplies fails, the load can be carried by the other power supply. In many applications where redundant power supplies are used, it is desirable that the circuit be capable of dynamically disconnecting the load from the power supply; to save power in certain applications and in addition to isolate a system fault, such as a short circuit in the load or in the power supply.

Prior art redundant power supply circuits commonly use a diode connected in series between each power supply, its associated switch, and the load. These diodes serve to isolate faults and prevent them from propagating between the power busses. However, because of the fixed voltage drop across the diode in its forward conducting direction, these diodes reduce efficiency, particularly in low voltage applications (e.g. a 0.5 volt drop across the diode in 5 volt supply system).

Proposals have been made in the prior art to use MOSFET transistors as the switch in redundant power supply applications. Particularly, to connect the MOSFET switch "backwards" between the power source and the load. For example, with a P channel MOSFET, the drain is connected to the positive terminal of the d.c. power supply and the source is connected to the load (i.e. the reverse of the typical circuit connection for a MOSFET). In this configuration, the integral diode of the MOSFET is oriented so that it will not conduct current from the load to the power supply when the MOSFET is turned off. However, in this configuration, the integral diode does provide a conduction path from the power supply to the load with the MOSFET off so that the MOSFET switch does not isolate load faults from the power supply.

SUMMARY OF THE INVENTION

An object of this invention is the provision of a switching circuit for redundant power supplies to efficiently connect the load to the power supplies and to isolate faults (e.g. shorts) in the load or the power supply so that they will not propagate through the system.

Another object of the invention is the provision of such a power supply switching circuit which requires a minimum of circuit components for its implementation Briefly, this invention contemplates the provision of an efficient, dual-source, fault tolerant power control switching circuit in which two power sources are connected to a load by a pair of MOSFET control switches, each connected respectively in series between one of the sources and the load, with their integral diodes forwardly biased between the power source and load. An isolating MOSFET switch is connected in series between the pair of MOSFET control switches and the load with its integral diode back biased between the power sources and the load. Two control lines control the on-off state of all three MOSFET switches so that the isolating MOSFET switch is on when either control switch is on and is off when both control switches are off. In this way the isolating switch isolates the power supplies from the load in its off state without introducing an appreciable drop in its on state.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
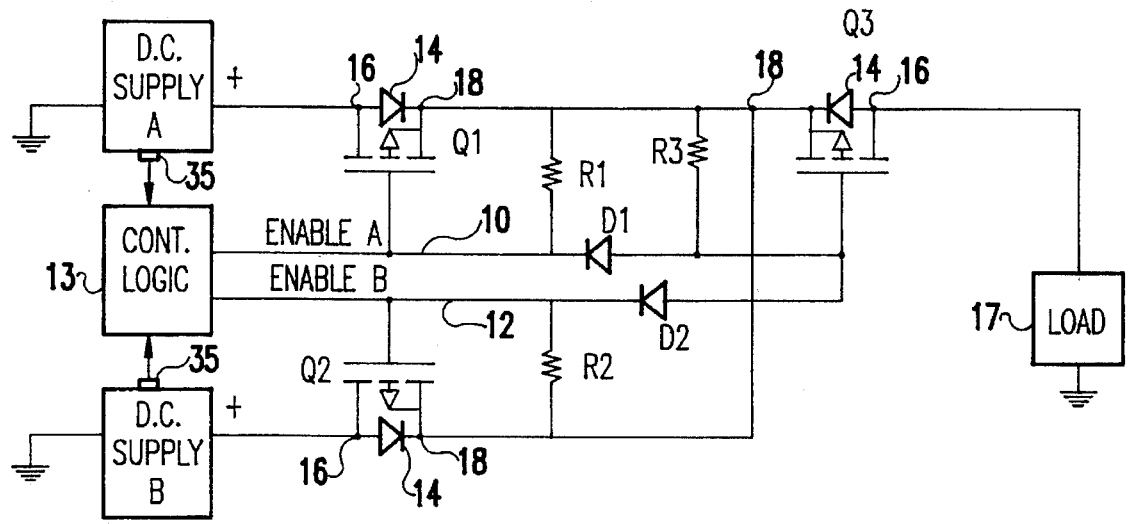
FIG. 1 is a schematic diagram of a redundant power supply switching circuit in accordance with the teaching of this invention implemented with P-channel MOSFETs.

Referring now to FIG. 1, a redundant power supply circuit in accordance with the teachings of this invention has three P-channel MOSFET transistor switches; control switches Q1 and Q2, and isolation switch Q3. In addition, it includes bleed resistors R1, R2 and R3, diodes D1 and D2, and control lines 10 and 12, labeled enable A and enable B, respectively. As will be appreciated by those skilled in the art, each MOSFET switch includes an integral body diode 14 indicated schematically in the drawing. The drain terminal 16 of MOSFET control switch Q1 is connected to the positive terminal of power supply A and the drain terminal 16 of MOSFET control switch Q2 is connected to the positive terminal of power supply B. Their respective source terminals 18 are connected to the source terminal 18 of MOSFET isolation switch Q3. Thus it will be appreciated MOSFET switches Q1 and Q2 are connected in a manner that is opposite to the conventional manner of connecting P-channel MOSFETs, while isolation MOSFET Q3 is connected in the conventional manner (i.e. source to the positive power supply and drain to a load 17).

The control lines 10 (enable A) and 12 (enable B) are connected to control logic 13, and control all three MOSFET switches, Q1, Q2, and Q3. Control line 10 connects enable A of control logic 13 directly to the gate of MOSFET control switch Q1, and, via a diode D1, to the gate of MOSFET isolation switch Q3. Similarly, control line 12 connects enable B of control logic 13 directly to the gate of MOSFET control switch Q2, and, via diode D2, to the gate of MOSFET isolation switch Q3. Bleed resistors R1, R2, and R3 provide a discharge path for the gates of MOSFET switches Q1, Q2, and Q3 respectively. R1 and R2 are optional since R3 will provide a discharge path for Q1 and Q2.

In operation, to connect a low voltage d.c. (e.g. 3v–15v) power supply A to a load 17, control line 10 (enable A) is pulled low by control logic 13, coupling an enable A voltage directly to the gate of MOSFET control switch Q1 and to the gate of MOSFET isolation switch Q3 via diode D1. The enable A voltage is selected so that the source to gate voltages of MOSFET control switch Q1 and MOSFET isolation switch Q3 are above their respective conduction threshold voltages. The drop across the integral diode 14 of MOSFET control switch Q1, which couples the supply voltage A to the source terminal 18 of MOSFET control switch Q1 and of MOSFET isolation switch Q3, and the drop across D1 must be taken into account. Diode D2 prevents the low voltage state of enable A on line 10 from turning on MOSFET control switch Q2. With the channels of Q1 and Q3 fully enhanced, the voltage drop from the supply A to the load is typically less than 100 millivolts.

Assuming line 12 is high, line 10 is pulled high to simultaneously switch MOSFET switches Q1 and Q3 to their nonconducting states, opening the connection from power supply A to the load 17 through MOSFET switches Q1 and Q3. Alternately, letting the enable line 10 float will discharge the gates through the bleed resistors R1 and R3 and the diodes D1 and D2.

Connection of the supply B to the load 17 is accomplished in a similar manner to that just described in connecting supply A to the load. With line 10 (enable A) high and line 12 (enable B) low, MOSFET control switch Q1 will be in its nonconducting state, and MOSFET switches Q2 and Q3 will be in a conducting state. The nonconducting state of MOSFET switch Q1 and switch Q1's integral diode 14 isolates the supply A from the load 17 and from supply B in the event of a short in power supply A, for example.

With lines 10 and 12 (enable A and enable B) both high, MOSFET switches Q1, Q2, and Q3 are each in a nonconducting state. In this state, MOSFET isolation switch Q3 and its integral diode 14 isolate both power supplies A and B from the load, which is desirable in the event of a short in the load, for example.

MOSFET control switches Q1 and Q2 can both be in a conducting state (along with MOSFET isolation switch Q3) to couple power supplies A and B to the load simultaneously, if desired, so long as neither of the power supplies is of a type that sinks current in normal operation. For this mode of operation, a sensor 35 is coupled to each of the supplies and to the control logic 13 in order to disconnect a supply via its MOSFET control switch Q1 or Q2 in the event a failure is detected in one supply.

With discrete components in a high radiation environment, it may be necessary to use a negative charge pump to pull the enable lines 10 and 12 below ground by a few volts to ensure the devices are fully enhanced since there is typically a gate threshold shift in response to radiation exposure; see IBM Technical Disclosure Bulletin TDB892-0129n "Micro Power Controller for Fault Tolerant VLSI Space Processors." If the circuitry is implemented in a monolithic integrated circuit, the MOSFET thresholds can be adjusted to an optimum level consistent with required voltages and radiation hardness.

Figure 2:
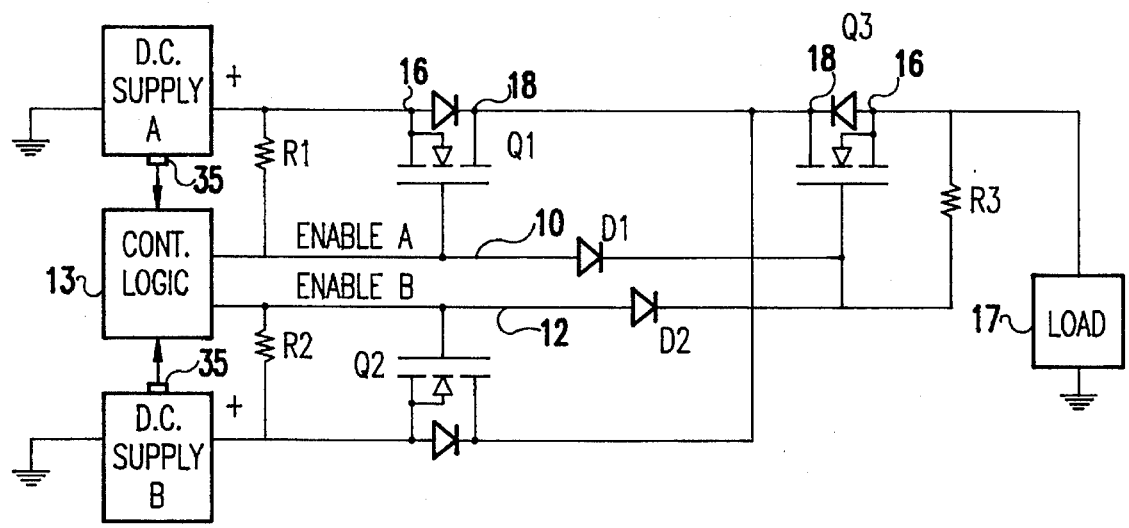
FIG. 2 is a schematic diagram similar to FIG. 1 showing an N channel MOSFET implementation of the invention.

N-channel MOSFETs could also be used. This alternate embodiment is shown in FIG. 2. The polarity of the diodes and enable lines is reversed, but otherwise the operation is consistent with the P-channel embodiment of FIG. 1 and will not be repeated. While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A fault tolerant switching circuit for a redundant power supply, comprising in combination:

a first d.c. power source;

a second d.c. power source;

a load;

a first MOSFET control switch having an integral diode; said first MOSFET control switch connected in series between said first d.c. power source and said load with its integral diode forwardly biased from said first power supply to said load;

a second MOSFET control switch having an integral diode, said second MOSFET control switch connected in series between said second d.c. power source and said load with its integral diode forwardly biased from said second power source to said load;

a MOSFET isolation switch having an integral diode, said MOSFET isolation switch connected in series between said load and said first MOSFET control switch and said second MOSFET control switch with the integral diode of said MOSFET isolation switch back biased from said first d.c. power source to said load and from said second d.c. power source to said load;

a first enable signal line connected to a gate electrode of said first MOSFET control switch and a gate electrode of said MOSFET isolation switch, said first enable signal line closing said first MOSFET control switch and said MOSFET isolation switch in a first state of said first enable signal line and opening said first MOSFET control switch and said MOSFET isolation switch in a second state of said first enable signal line; and a second enable signal line connected to a gate electrode of said second MOSFET control switch and a gate electrode of said MOSFET isolation switch, said second enable signal line closing said second MOSFET control switch and said MOSFET isolation switch in a first state of said second enable signal line and opening said second MOSFET control switch and said MOSFET isolation switch in a second state of said second enable signal line.

2. A fault tolerant switching circuit for a redundant power supply as in claim 1 further including a diode connected in series in said first enable signal line and a diode connected in series in said second enable signal line.

3. A fault tolerant switching circuit for a redundant power supply as in claim 1 wherein said first MOSFET control switch, said second MOSFET control and said MOSFET isolation control switch is a P channel MOSFET.

4. A fault tolerant switching circuit for a redundant power supply as in claim 1 wherein said first MOSFET control switch, said second MOSFET control and said MOSFET isolation control switch is an N channel MOSFET.

5. A fault tolerant switching circuit for a redundant power supply as in claim 2 wherein said first MOSFET control switch, said second MOSFET control and said MOSFET isolation control switch is a P channel MOSFET.

6. A fault tolerant switching circuit for a redundant power supply as in claim 2 wherein said first MOSFET control switch, said second MOSFET control and said MOSFET isolation control switch is an N channel MOSFET.

7. A fault tolerant switching circuit for a redundant power supply as in claim 1 further including a bleed resistor providing a discharge path for said gate electrode of said first MOSFET control switch when said first MOSFET control switch is in a nonconducting state.

8. A fault tolerant switching circuit for a redundant power supply as in claim 1 further including a bleed resistor providing a discharge path for said gate electrode of said second MOSFET control switch when said second MOSFET control switch is in a nonconducting state.

9. A fault tolerant switching circuit for a redundant power supply as in claim 1 further including a bleed resistor providing a discharge path for said gate electrode of said MOSFET isolation switch when said MOSFET isolation switch is in a nonconducting state.

\* \* \* \* \*